(12) United States Patent
Fujii et al.

(10) Patent No.: US 8,585,799 B2
(45) Date of Patent: Nov. 19, 2013

(54) AIR PRE-TREATMENT DEVICE

(75) Inventors: Yasuhisa Fujii, Kyoto (JP); Masahiro Ueda, Kyoto (JP)

(73) Assignee: Empire Technology Development LLC, Wilmington, DE (US)

( * ) Notice: Subject to any disclaimer, the term of this patent is extended or adjusted under 35 U.S.C. 154(b) by 467 days.

(21) Appl. No.: 13/058,944

(22) PCT Filed: Jun. 15, 2010

(86) PCT No.: PCT/US2010/038612
§ 371 (c)(1),
(2), (4) Date: Feb. 14, 2011

(65) Prior Publication Data
US 2011/0303086 A1 Dec. 15, 2011

(51) Int. Cl.
*B03C 3/68* (2006.01)

(52) U.S. Cl.
USPC ..... 95/3; 55/485; 55/486; 55/487; 73/863.23; 95/8; 95/287; 96/19; 96/66; 96/413; 96/417

(58) Field of Classification Search
USPC ........ 95/3, 8, 78, 79, 273, 287; 96/19, 66, 75, 96/413, 417; 55/350.1, 485–487; 73/863.23
See application file for complete search history.

(56) References Cited

U.S. PATENT DOCUMENTS

| | | | | |
|---|---|---|---|---|
| 2,602,521 | A * | 7/1952 | Smith | 55/487 |
| 3,266,228 | A * | 8/1966 | Plizak et al. | 55/426 |
| 4,117,715 | A | 10/1978 | Hoenig | |
| 4,277,263 | A * | 7/1981 | Bergeron | 55/282 |
| 4,387,603 | A * | 6/1983 | Nelson | 73/863.22 |
| 4,597,781 | A * | 7/1986 | Spector | 96/52 |
| 4,734,111 | A * | 3/1988 | Hoffmann et al. | 435/266 |
| 4,961,916 | A * | 10/1990 | Lesage et al. | 422/88 |
| 5,061,364 | A | 10/1991 | Metala et al. | |
| 5,123,936 | A * | 6/1992 | Stone et al. | 95/65 |
| 5,185,086 | A * | 2/1993 | Kaali et al. | 210/645 |
| 5,247,827 | A | 9/1993 | Shah | |
| 5,573,563 | A * | 11/1996 | Odom et al. | 55/301 |
| 5,800,587 | A * | 9/1998 | Kahlbaugh et al. | 55/486 |
| 6,101,886 | A | 8/2000 | Brenizer et al. | |
| 2004/0060440 | A1 | 4/2004 | McGee et al. | |
| 2004/0211160 | A1 * | 10/2004 | Rammig et al. | 55/382 |

FOREIGN PATENT DOCUMENTS

| | | | | |
|---|---|---|---|---|
| DE | 100 55 872 | | 6/2002 | |
| GB | 2 311 857 | | 10/1997 | |
| JP | 54-34181 | A * | 3/1979 | 55/487 |

OTHER PUBLICATIONS

Nakahara, T., "Development of Gas Sensors for Air Quality," *Chem. Sens.*, 1999, vol. 15, Supplement B, pp. 97-99 (English abstract and partial translation).

Sekiguchi, K., et al., "Performance Evaluation of an Impactor Filter and Its Application to Measurement of Atmospheric Ultrafine Particles," *Earozoru Kenkyu*, Winter 2008, vol. 23, No. 4, pp. 278-288 (English abstract and partial translation).

(Continued)

*Primary Examiner* — Richard L Chiesa
(74) *Attorney, Agent, or Firm* — Foley & Lardner LLP

(57) ABSTRACT

The present technology provides an air pre-treatment and monitoring device that includes an inlet port configured to receive an air flow and an outlet port configured to expel the air flow. The illustrative air pre-treatment device further includes a multiple-stage filter arranged between the inlet and outlet ports and that is configured to filter particles from the air flow.

17 Claims, 5 Drawing Sheets

(56) References Cited

OTHER PUBLICATIONS

Suzuki, Kenichiro et al., "Identification of composite particles of diesel exhaust particles and iron particles of railroad origin," *Bunseki Kagaku*, 2004, vol. 53, No. 1, The Japan Society for Analytical Chemistry, pp. 7-12 (English abstract and partial translation).
International Search Report and Written Opinion for PCT/US2010/038612 mailed Sep. 17, 2010.
Environmental Restoration and Conservation Agency, 2009, (http://www.erca.go.jp/taiki/taisaku/ta_kaisetu.html), retrieved from the internet Feb. 2, 2011, 4 pages (English translation unavailable).
Ministry of Land, Infrastructure and Transport, 2002, (http://www.mlit.go.jp/kisha/kisha02/09/090604_.html), retrieved from the internet Feb. 2, 2011, 3 pages (English translation unavailable).
City of Yokohama, 2005-2010, (http://www.city.yokohama.jp/me/kankyou/etc/jyorei/keikaku/kanri/nenjihoukoku/h16/211.html), retrieved from the internet Feb. 2, 2011, 7 pages (English translation unavailable).

* cited by examiner

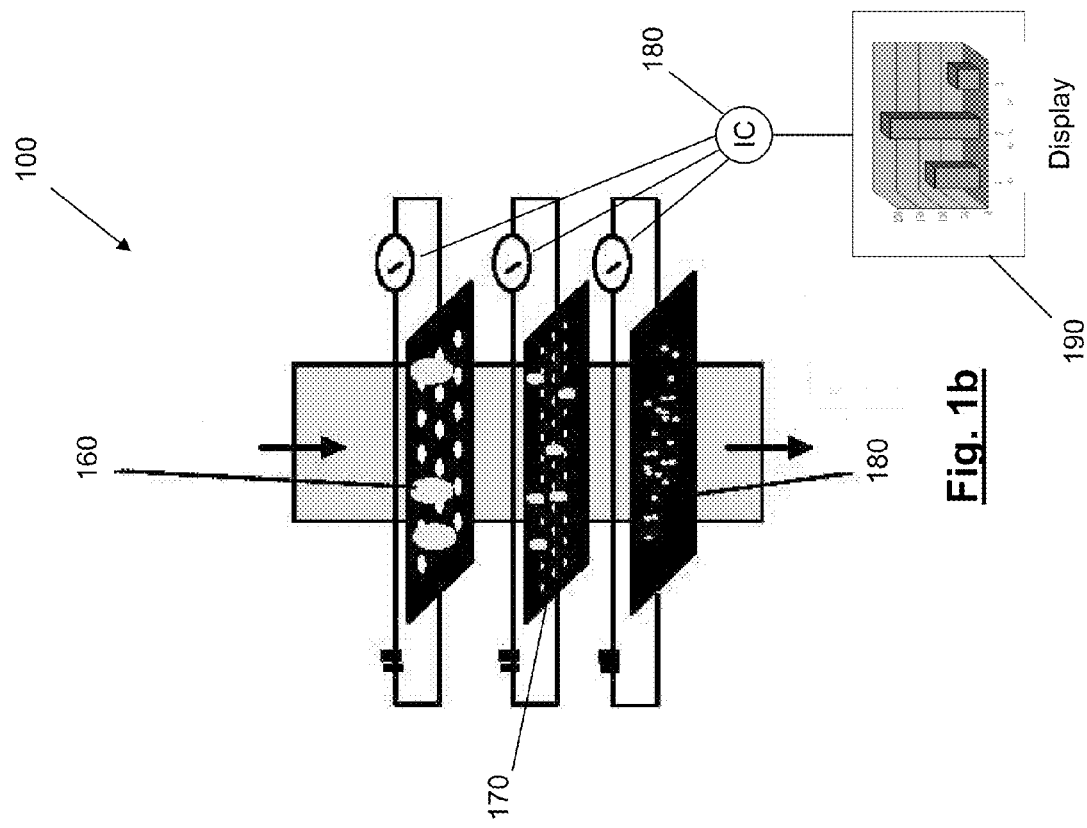
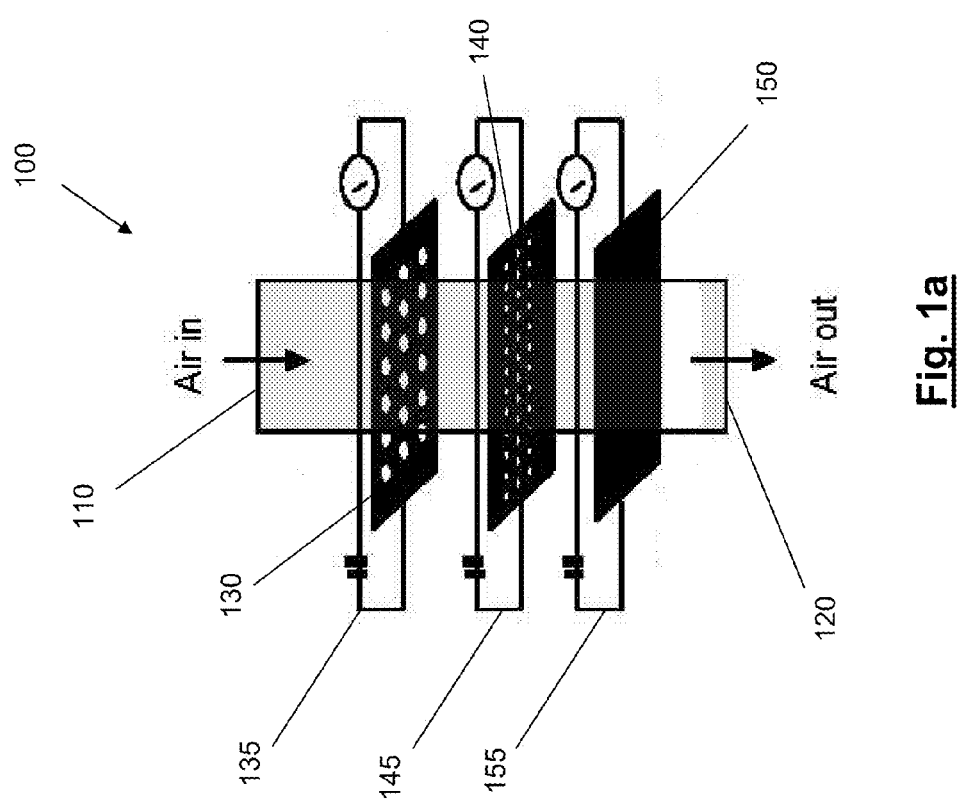

AIR PRE-TREATMENT DEVICE

CROSS-REFERENCE TO RELATED APPLICATIONS

The present application is a U.S. national stage application claiming the benefit of International Application No. PCT/US2010/038612, filed on Jun. 15, 2010, the entire contents of which is incorporated herein by reference in its entirety.

BACKGROUND

The following description is provided to assist the understanding of the reader. None of the information provided or references cited is admitted to be prior art.

Monitoring and treatment of air pollutants are important industries and such methods and devices have innumerable applications. Many countries, municipalities, and governments mandate specific monitoring and air quality reporting to increase awareness and safety for the public. In industrial settings, monitoring and treatment of air pollution may be required for the safety of workers involved in activities that produce hazardous materials or that involve such hazardous materials. Monitoring of air pollutants also has substantial application for the public at large; for example, in individual homes for the detection of carbon monoxide and by individuals in the event of a chemical or biological terrorist attack.

Air monitoring devices having small sizes and increased efficiencies have advantages over devices having large sizes and inefficiencies. Small device sizes allow for the use of monitoring devices in applications that will not allow for large device sizes. For example, the location of monitoring devices in small areas and the inclusion of monitoring devices on personal safety equipment. Large device sizes have the practical effect of reducing the portability and the applicability of monitoring devices in many instances. Efficient monitoring devices allow for faster analysis of air pollutants and lead to faster notification of pollutant levels. However, small monitoring devices have traditionally been inferior to conventional large monitoring equipment in terms of accuracy and sensitivity.

SUMMARY

The present technology provides an illustrative air pre-treatment method that comprises receiving an air flow at an inlet port of an air pre-treatment device and passing the air flow through first and second filters. The first filter includes a first set of pores each having a first size such that the first filter is configured to prevent passage of first particles in the air flow that are larger than the first size. The second filter includes a second set of pores each having a second size that is smaller than the first size such that the second filter is configured to prevent passage of second particles in the air flow that have passed through the first filter and that are larger than the second size. The method further includes expelling the air flow from an outlet port of the air pre-treatment device.

The present technology further provides an illustrative air pre-treatment device that includes an inlet port configured to receive an air flow and an outlet port configured to expel the air flow. The illustrative air pre-treatment device further includes a multiple-stage filter arranged between the inlet and outlet ports and that is configured to filter particles from the air flow. The multiple-stage filter includes a first filter having a first set of pores each having a first size such that the first filter is configured to prevent passage of the particles in the air flow that are larger than the first size. The multiple-stage filter further includes a second filter having a second set of pores each having a second size smaller than the first size such that the second filter is configured to prevent passage of the particles in the air flow that have passed through the first filter and that are larger than the second size.

The present technology also provides another illustrative air pre-treatment device that includes means for receiving an air flow and means for expelling the air flow. The illustrative air pre-treatment device further includes first means for filtering the air flow having a first set of pores each with a first size such that the first means is configured to prevent passage of first particles in the air flow that are larger than the first size. The illustrative air pre-treatment device also includes a second means for filtering the air flow from the first means. The second means includes a second set of pores each having a second size that is smaller than the first size such that the second means is configured to prevent passage of second particles in the air flow that have passed through the first means and that are larger than the second size.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 1a and 1b depict an air pollutant monitoring device in accordance with an illustrative embodiment.

DETAILED DESCRIPTION

Figure 2:
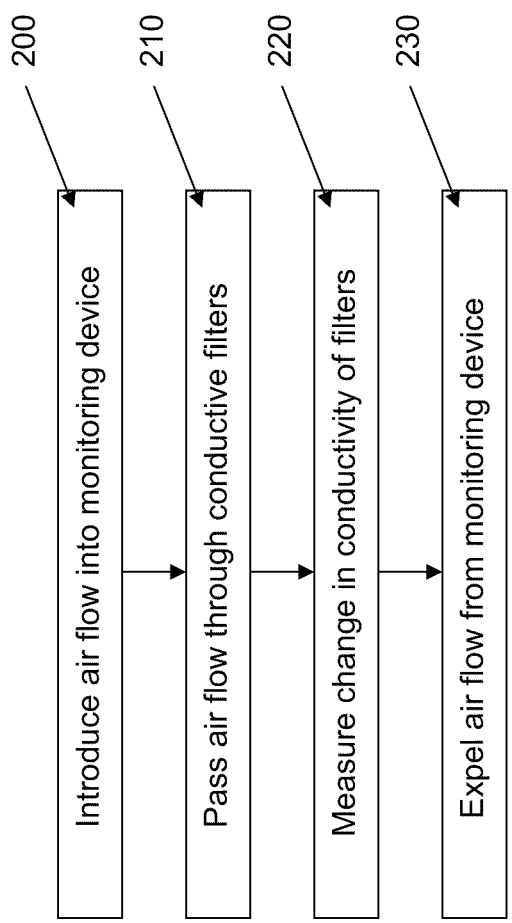
FIG. 2 depicts a method for quantitatively measuring air particles in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

There are a variety of issues associated with traditional air pollutant monitors. These include, but are not limited to, the traditionally large size of air monitors and the complexity and associated expense of traditional air monitors. In addition, the large size and the complexity of traditional air monitors have limited the portability of such monitors. Smaller, more portable air monitors have often suffered from lower efficiency and sensitivity compared with larger, more complex monitors. Described herein are systems for monitoring and pretreating air using cost-effective, sensitive, and efficient air pre-treatment and monitoring devices. These air pre-treatment and monitoring devices allow for maximized sensitivity and efficiency while minimizing the size and expense associated with the device.

FIGS. 1a and 1b depict an air particle monitoring device 100 in accordance with an illustrative embodiment. Monitoring device 100 includes an inlet port 110 and an outlet port 120. Air which may include various sizes of particles is passed into monitoring device 100 via inlet port 110. A fan or a pump may be used to pass air through monitoring device 100. In an embodiment, a low-energy micro-fan may be arranged near outlet port 120 to pull air into and pass air out of monitoring device 100.

The air passes through one or more conductive filters 130, 140, and 150 which are arranged in a chamber of monitoring device 100. Conductive filters 130, 140, and 150 may include any type of filter through which contact with various particles in the air changes the electrical conductivity of the filter. Examples of such filters include filters that have electrically conductive porous materials deposited on their surface. The electrically conductive porous material may be any electrically conductive metal known to those of skill in the art, e.g., gold, silver, aluminum, etc. In an embodiment, conductive filter 130 may be a HEPA filter that comprises a porous, metal-deposited surface material, conductive filter 140 may be a metal-deposited paper filter, and conductive filter 150 may be a metal-deposited micro-fiber non-woven filter. In alternative embodiments, monitoring device 100 may include any number of conductive filters. Each of conductive filters 130, 140, and 150 include a plurality of pores through which the air is passed and thereby filtered. The pores on each respective conductive filter have substantially uniform areas and/or diameters. For example, a first pore of a first filter will have the same size as a second pore of the first filter. The sizes of the pores on each particular respective conductive filter should be as uniform as possible, although discrepancies up to 10% may be acceptable in various embodiments.

However, as described below, the pores of different conductive filters have different sizes so that the different conductive filters are configured to prevent the passage of particles having different sizes. For example, the pores of a first filter may have a larger size than the pores of a second filter. The amount by which the pore sizes differ will depend on the size particles each filter are intended to trap. In an illustrative embodiment, a first filter has pores with diameter sizes of at least about 3 µm, a second filter has pores with diameter sizes of about 1 µm, a third filter has pores with diameter sizes of about 0.3 µm, and subsequent filters have pores sizes of about 0.1 µm, 0.03 µm, and so on.

In an illustrative embodiment, the pores of the conductive filters that are closer to the inlet port have larger sizes than the pores of each conductive filter that is farther from the inlet port. For example, the pores of conductive filter 130 have a first substantially uniform area and/or diameter. Similarly, the pores of conductive filter 140 have a second substantially uniform area and/or diameter that is smaller than the first substantially uniform area and/or diameter of conductive filter 130, and the pores of conductive filter 150 have a third substantially uniform area and/or diameter that is smaller than both the first and second substantially uniform areas and/or diameters of both conductive filters 130 and 140. In this way, particles having smaller and smaller sizes are gradually filtered out as they pass through the multiple conductive filters. For example, all particles 160 larger than the pore size of conductive filter 130 are filtered by conductive filter 130. All particles 170 smaller than the pore size of conductive filter 130 but larger than the pore size of conductive filter 140 are filtered by conductive filter 140. All particles 180 smaller than the pore size of conductive filter 140 but larger than the pore size of conductive filter 150 are filtered by conductive filter 150. In alternative embodiments, additional conductive filters with smaller pore sizes may be included in monitoring device 100 to further filter the air by removing particles having a smaller size than the pores of conductive filter 150.

In an example embodiment, the diameter of the pores of conductive filter 130 may be 10 µm in order to trap lint, various larger dust particles (such as dust from construction sites), or yellow sand. The diameter of the pores of conductive filter 140 may be 1 µm in order to trap various household dusts and allergens, cigarette smoke, cooking smoke, pollen, and cough spray containing bacteria and viruses. The diameter of the pores of conductive filter 150 may be 0.1 µm in order to trap nano-particles such as diesel particulates in exhausts.

Each of conductive filters 130, 140, and 150 are electrically connected to respective electrical circuits 135, 145, and 155. Electrical circuits 135, 145, and 155 include respective meters that measure any change in the electrical conductivity of conductive filters 130, 140, and 150. As particles in the air become trapped in the pores of conductive filters 130, 140, and 150 the conductivity of the respective conductive filters 130, 140, and 150 changes. By measuring the change in conductivity of conductive filters 130, 140, and 150, the concentration of particles in the air that have sizes which correspond to the respective pore sizes of the conductive filters is determined.

In an embodiment, the conductivity of each filter 130, 140, and 150 is measured by respective micro-galvanometers that are respectively connected to electrical circuits 135, 145, and 155. A standard voltage is applied to each conductive filter 130, 140, and 150 and the current through each filter is measured and sent to an integrated circuit 180 that is connected to the respective micro-galvanometers. Integrated circuit 180 calculates the amount of particles trapped by comparing the measured current to a master curve that was previously input into integrated circuit 180. The greater the number of particles trapped, the higher the current will be because the trapped particles increase the conductivity of the filter. In an embodiment, integrated circuit 180 may create figures or other types of displays to demonstrate the results of the current measurement. These figures can be monitored via a display device 190 that is attached to monitoring device 100. An example figure showing the results of the current measurement are depicted in FIG. 1b. In alternative embodiments, any device known to those of skill in the art may be used to measure the current through the conductive filter.

FIG. 2 depicts a method for quantitatively measuring air particles using monitoring device 100 of FIG. 1 in accordance with an illustrative embodiment. In an operation 200, air is received at the inlet port of monitoring device 100 and is thereby introduced into a filtering chamber of the monitoring device. The air is passed through a plurality of conductive filters having successively smaller pore sizes, in an operation 210. In an illustrative embodiment, the pores of each respective conductive filter having a substantially uniform cross-sectional area. As the air is passed through the conductive filters, particles in the air that are larger in size than the pore sizes of the conductive filters become trapped by the pores of the conductive filters. As the particles become trapped, the conductivity of the conductive filters changes because the trapped particles change the overall resistance associated with the respective conductive filter.

In an operation 220, any change in conductivity of the individual conductive filters is measured using respective circuits that are electrically connected to the respective conductive filters. By measuring the change in conductivity of the conductive filters, the concentrations of particles in the air having sizes that are larger than the pore sizes of the respective conductive filters are determined. A voltage is applied to the respective conductive filters and a corresponding current across the respective conductive filters is measured using a microgalvanometer or any other electrical current measurement device known to those of skill in the art. The measured electrical current amounts are compared to a master curve that shows the relationship between various amounts of the particles trapped by the filter and the associated electrical current values across the filter. The master curve is created using a calibration process by which precise, known quantities of particles having known diameters are passed through monitoring device 100 or a similar monitoring device. Voltages are applied to the conductive filters of the monitoring device and the resultant electrical currents across the conductive filters are measured and recorded. The process is repeated for different sizes and amounts of particles until enough data has been recorded to create the master curve. Using the master curve, amounts of particles in air passed through monitoring device 100 can be extrapolated by comparing the resulting measured electrical current values across the conductive filters of monitoring device 100 to the master curve.

In an operation 230, the air flow is expelled from the monitoring device via an outlet port.

Figure 3:
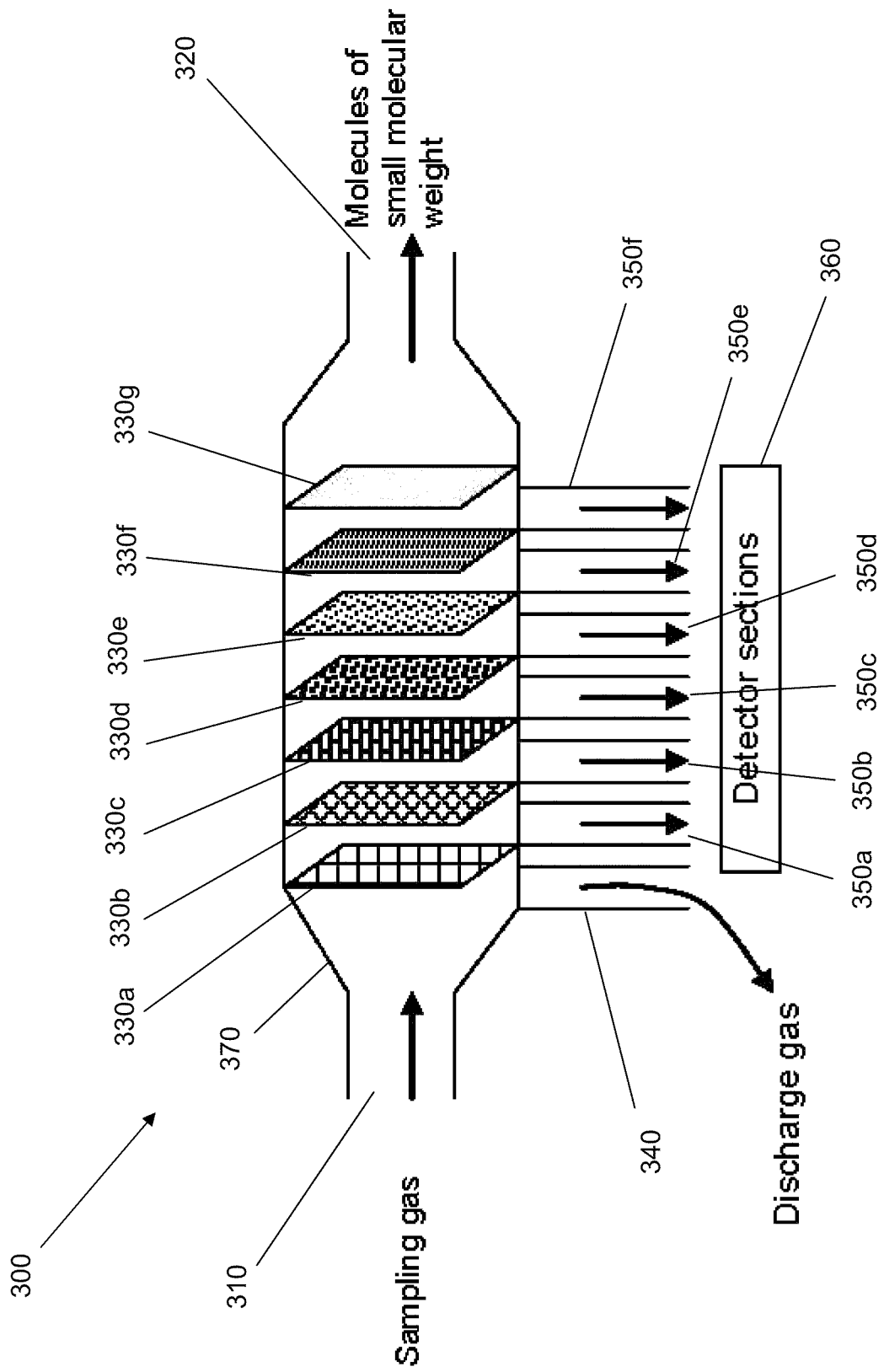
FIG. 3 depicts an air pretreatment and monitoring device in accordance with an illustrative embodiment.

FIG. 3 depicts an air pre-treatment and monitoring device 300 in accordance with an illustrative embodiment. Device 300 includes an inlet port 310 and an outlet port 320. Air which may include various sizes of particles is passed into a filtering chamber 370 of device 300 via inlet port 310. The air is then passed through one or more multiple-stage filters 330a-330g. Each filter 330a-330g includes a plurality of substantially uniformly-sized pores through which the air is passed. In this way, particles having a size larger than the size of the pores are not able to pass through the respective filter and thus become trapped by the filter. Subsequent filters have smaller pore sizes than the preceding filters. For example, in an illustrative embodiment, the pores of the first filter 330a nearest inlet port 310 may have diameters of at least about 1 mm. The pores of the second filter 330b from inlet port 310 may have diameters of at least about 30 μm. Subsequent filters 330c-330g (in order of distance from the inlet port) may have pores having diameter sizes of at least about 3 μm, 1 μm, 0.3 μm, 0.1 μm, 0.03 μm, and so on. As such, each subsequent filter prevents the passage of smaller particles than the preceding filter. In this way, particles having different sizes may be selectively separated from the air. Filters 330a-330g may be designed with any pore size depending on the desired application for device 300.

One or more stages of the multiple-stage filter are defined between each of filters 330a-330g and the subsequent filter. For example, a first stage is defined in the volume between filter 330a and filter 330b, a second stage is defined in the volume between filter 330b and filter 330c, and so on. Device 300 includes one or more discharge ports 350a-350f that are configured to selectively convey the particles trapped in each respective stage to respective detectors 360. For example, a first discharge port 350a is configured to convey the particles that have passed through first filter 330a but are not able to pass through second filter 330b, i.e., a first discharge port 350a is configured to convey particles from the first stage to a respective detector 360. As described below, the trapped particles are conveyed to respective detectors via a fan, pump, or other device configured to move air between each stage and its respective detector.

Similarly, a second discharge port 350b is configured to convey the particles that have passed through second filter 330b but are not able to pass through third filter 330c. A third discharge port 350c is configured to pass the particles that have passed through third filter 330c but are not able to pass through fourth filter 330d, and so on for each subsequent discharge port 350d-350f. The quantity of discharge ports 350a-350f corresponds to the quantity of filters of the multiple-stage filter. In alternative embodiments, each discharge port 350a-350f may correspond to multiple stages of the multiple-stage filter.

Discharge ports 350 convey the various particles to respective detectors 360. After the initial air flow containing the various particles has been passed through the filters for a predetermined amount of time, the air flow is stopped. Particles will then be trapped in each stage. To move the particles from each stage to the detector, clean air is drawn through each discharge port 350a-350f to the detector via a fan, pump, or other device configured to move air between a respective discharge port 350a-350f and its respective detector 360. This clean air causes the particles trapped in each respective stage to be moved into a respective detector 360. In an alternative embodiment, particles may also be conveyed to each respective detector 360 while the initial air flow containing the various particles is being passed through the filters.

Each detector 360 is configured to qualitatively and/or quantitatively detect target particles. Each detector 360 may be one of a fluorescence analyzer, an absorption spectrometer, a Raman analyzer, an X-ray fluorescence spectrometer, a flow cylometer, a mass spectrometer, an electrochemical analyzer, or any other particle detector known to those of skill in the art. Such detectors are capable of analyzing and detecting various particles trapped by the filters.

Device 300 may also include a discharge port 340 that is configured to discharge particles from device 300 that are larger than first filter 330a. In this way, particles having a large size (e.g., aerosol, pollen, mites, etc.) and which are considered unimportant for air quality monitoring may be initially expelled from device 300.

In an illustrative embodiment, filters 330a-330g may be conductive filters that are connected to respective electrical conductivity meters by electrical circuits as discussed above with reference to FIG. 1. As such, the electrical conductivity meters are configured to measure changes in the electrical conductivity of filters 330a-330g caused by the entrapment of particles in the pores of filters 330a-330g. The conductivity changes of filters 330a-330g are then used to determine the concentration of particles of various sizes in the air flow through device 300. The particles in each stage may then be conveyed to respective detectors 360 via discharge ports 350a-350f, wherein detectors 360 may obtain additional information about the particles.

In an embodiment, air pre-treatment and monitoring device 300 may be automatically controlled so that it is configured to operate at predetermined intervals or at predetermined times in order to monitor particle levels in the air. As such, air pre-treatment and monitoring device 300 may be communicatively coupled to a processor or computing device that is configured to activate air pre-treatment and monitoring device 300 at the predetermined intervals or at predetermined times.

In addition, in another embodiment, air pre-treatment and monitoring device 300 may be coupled to a filtering system that is configured to be activated in response to a trigger signal from air pre-treatment and monitoring device 300. As such, if air pre-treatment and monitoring device 300 detects the presence of a specific type of quantity of a particle in the air, the filtering system will be activated to clean the particles from the air. Upon sufficient removal of the specific particle or of after reducing the quantity of the particle in the air to an acceptable level, the filtering system will shut off.

Figure 4:
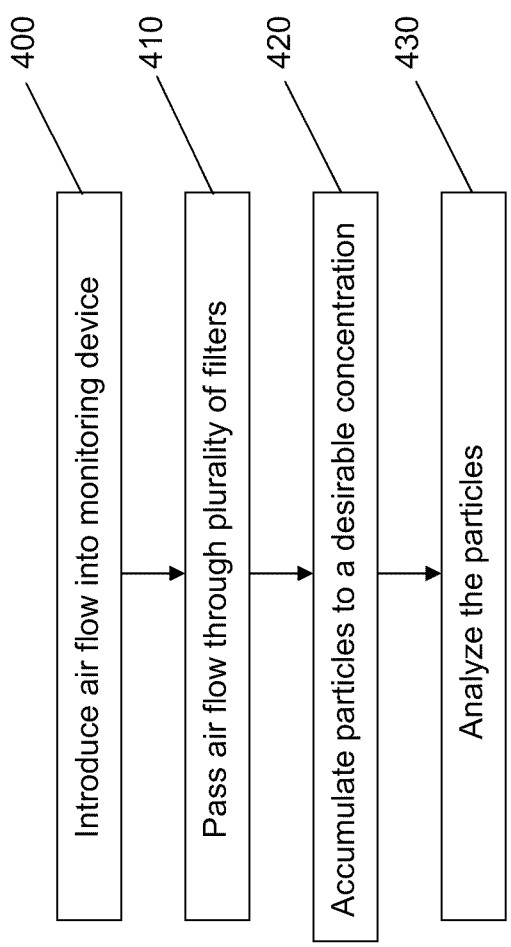
FIG. 4 depicts a method for quantitatively and/or qualitatively measuring air particles in accordance with an illustrative embodiment.

FIG. 4 depicts a method for quantitatively and/or qualitatively measuring air particles using a device 300 of FIG. 1 in accordance with an illustrative embodiment. In an operation 400, air is received at the inlet port of device 300 and is thereby introduced into the device. The air is passed through a multiple-stage filter comprising a plurality of filters having successively smaller pore sizes, in an operation 410. A plurality of stages of the multiple-stage filter are defined between each of the plurality of filters and a subsequent filter. As the air is passed through the multiple-stage filter, particles are trapped in various stages as they encounter filters having pore sizes that are larger than the size of the particles. In an operation 420, the air is continuously passed through the multiple-stage filter for a predetermined duration of time or until a desired amount of at least one target particle is accumulated.

In an operation 430, the various trapped particles are passed from the respective stages in which they are trapped to respective detectors via respective discharge ports. In an embodiment, the trapped particles are conveyed to the respective detectors while the air is being passed through the multiple-stage filter. The fan that causes the air to be passed through the multiple-stage filters also causes the trapped particles to be pushed to the detectors. In an alternative embodiment, the trapped particles may also be conveyed to the detectors after the initial air flow containing the various particles has been passed through the filters for a predetermined amount of time. After the predetermined amount of time has lapsed, the initial air flow is stopped. Particles will then be trapped in each stage. To move the particles from each stage to a respective detector, clean air is drawn through each discharge port to the detector via a fan, pump, or other device configured to move air between a respective discharge port and its respective detector. This clean air causes the particles trapped in each respective stage to be moved into a respective detector.

In an operation 440, the respective detectors qualitatively and/or quantitatively analyze the various particles. As such, the detectors may determine the types of particles within the different stages, the concentrations of the different types of particles, etc.

Figure 5:
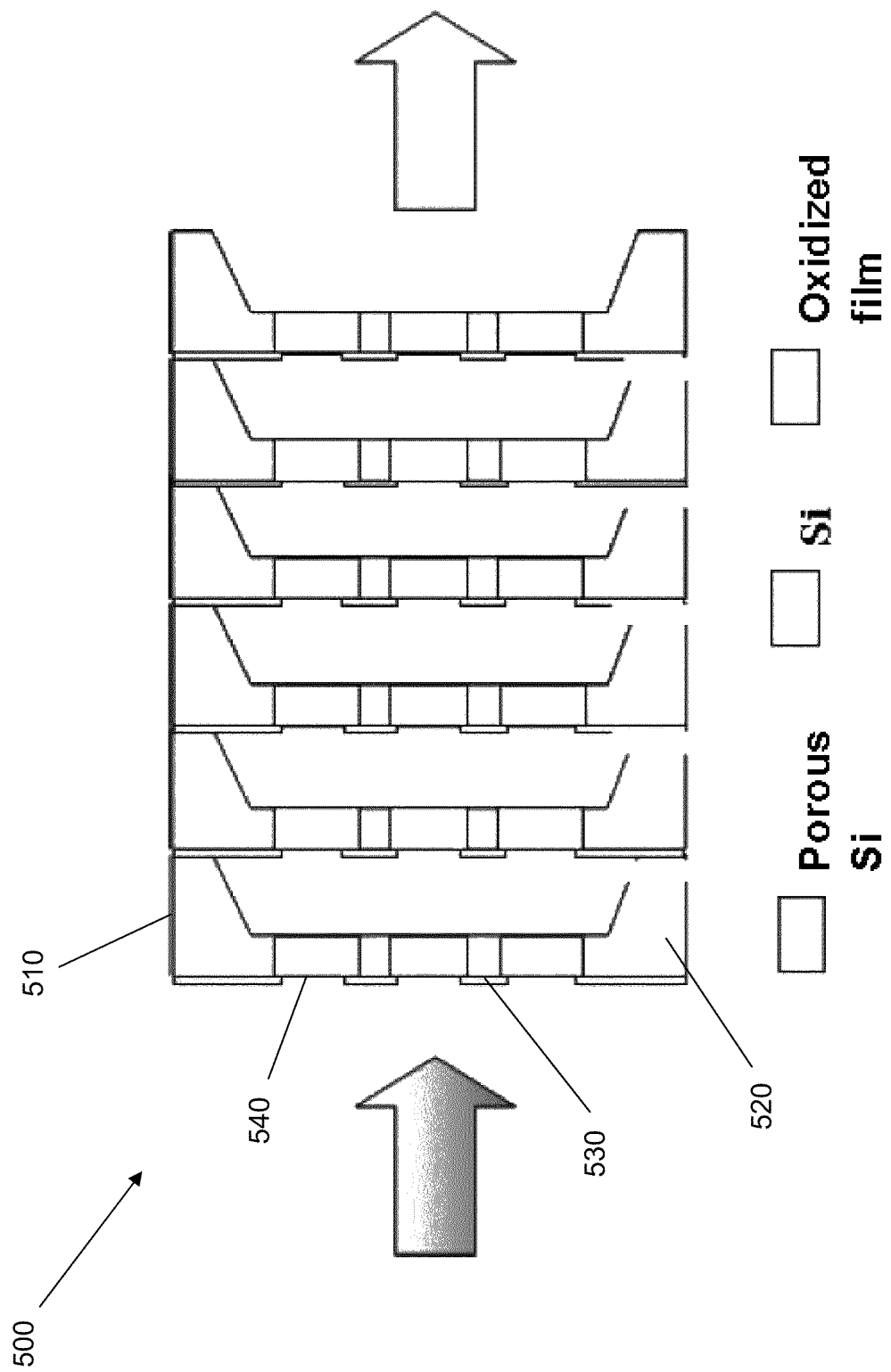
FIG. 5 depicts a plurality of multi-stage filters in accordance with an illustrative embodiment.

FIG. 5 depicts a multiple stage filter 500 in accordance with an illustrative embodiment. The multiple-stage filter 500 includes several filters 510. Filters 510 are formed using a silicon-electrolytic etching process in order to create a porous area on a silicon wafer. The filters 510 each include areas of silicon substrate 520, areas of porous silicon 540, and an oxidized film 530. Porous silicon 540 is formed by etching pores into silicon substrate 520. In an embodiment, P-type silicon substrate is soaked in a solution of hydrofluoric acid, and an electrical current is applied from the surface of silicon substrate 520 to the back of silicon substrate 520. The hydrofluoric acid thereby etches large numbers of micropores through silicon substrate 520 to form areas of porous silicon 540. The diameter of the micropores can be controlled by changing the concentration of the hydrofluoric acid, the amount of electrical current, and the duration of the etching process. Increased concentrations of hydrofluoric acid, increased amounts of electrical current, and longer durations will increase the diameter of the micropores.

As the micropores are formed in silicon substrate 520, silicon substrate 520 may become weak. To increase the strength of the filters, oxidized film 530 is formed over portions of the surface of silicon substrate 520 and prevents etching of pores in the portions of silicon substrate 520 over which oxidized film 530 is formed. In an embodiment, oxidized film 530 is formed using a photolithography process having an oxide film etching step as known to those of skill in the art.

Porous silicon 540 of each subsequent filter 510 comprises pores of a smaller size than the preceding filter. The sizes of the filters are determined based on the types of particles that are desired to be filtered. Example pore diameters may be 1 mm, 30 µm, 10 µm, 3 µm, 1 µm, 0.3 µm, 0.1 µm, 0.03 µm, etc. In alternative embodiments, the pore diameters of each filter 510 may have different sizes based on the types of particles that are desired to be filtered.

After creation of each filter 510, filters 510 are bonded together in series to create multiple-stage filter 500 with the first filter 510 of multiple-stage filter 500 having the largest pore sizes and each subsequent filter having smaller pore sizes than the preceding filter. The filters 510 may be bonded together without adhesives by applying a temperature of around 900° C. and pressurizing the silicon substrates in order to fuse the substrates together. In alternative embodiments, adhesives as known to those of skill in the art may be used to bond the filters 510 together.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving an air flow at an inlet port of an air pre-treatment device;
   passing the air flow through a first filter for a first duration of time, wherein the first filter comprises a first set of pores each having a first size, and wherein the first filter is configured to prevent passage of first particles in the air flow that are larger than the first size;
   passing the air flow from the first filter through a second filter for the first duration of time, wherein the second filter comprises a second set of pores each having a second size that is smaller than the first size, and wherein the second filter is configured to prevent passage of second particles in the air flow that have passed through the first filter and that are larger than the second size;
   expelling the air flow from an outlet port of the air pre-treatment device; and
   passing the second particles to a first particle detector through a discharge port located between the first and second filter by drawing air through the discharge port after the first duration of time has lapsed.

2. The method of claim 1, wherein the first and second filters are conductive filters that are configured to change electrical conductivity in response to a particle being trapped by the first or second filters.

3. The method of claim 2, further comprising measuring a change in the electrical conductivity of at least one of the first or second filters using an electrical circuit that is connected to the at least one of the first or second filters.

4. The method of claim 1, further comprising passing the air flow from the second filter through a third filter, wherein the third filter comprises a third set of pores each having a third size that is smaller than the second size, and wherein the third filter is configured to prevent passage of third particles in the air flow that have passed through the second filter and that are larger than the third size.

5. The method of claim 4, further comprising passing the third particles to a second particle detector.

6. The method of claim 1, further comprising accumulating the first and second particles to a desirable concentration by passing the air flow through the first and second filters for a predetermined period of time, and passing the second particles to a first particle detector after the predetermined period of time has elapsed.

7. The method of claim 1, further comprising discharging the particles in the air flow that are larger than the first size via a second discharge port disposed between the inlet port and the first filter.

8. An air pre-treatment device comprising:
   an inlet port configured to receive an air flow;
   an outlet port configured to expel the air flow; and
   a multiple-stage filter arranged between the inlet and outlet ports and configured to filter particles from the air flow during a first duration of time, wherein the multiple-stage filter includes:
      a first filter comprising a first set of pores each having a first size, wherein the first filter is configured to prevent passage of the particles in the air flow that are larger than the first size; and
      a second filter comprising a second set of pores each having a second size smaller than the first size, wherein the second filter is configured to prevent passage of the particles in the air flow that have passed through the first filter and that are larger than the second size; and
   a first discharge port configured to pass the particles in the air flow that have passed through the first filter and that are larger than the second size to a first particle detector by drawing air through the discharge port after the first duration of time has lapsed.

9. The air pre-treatment device of claim 8, wherein the first filter is nearer the inlet port than the second filter.

10. The air pre-treatment device of claim 8, wherein the first and second filters are conductive filters that are configured to change electrical conductivity in response to a particle being trapped by the first or second filters.

11. The air pre-treatment device of claim 10, further comprising an electrical circuit configured to measure a change in the electrical conductivity of at least one of the first or second filters.

12. The air pre-treatment device of claim 8, further comprising a third filter including a third set of pores each having a third size smaller than the second size, wherein the third filter is configured to prevent passage of the particles in the air flow that have passed through the second filter and that are larger than the third size.

13. The air pre-treatment device of claim 8, further comprising a second discharge port configured to pass the particles in the air flow that have passed through the second filter and that are larger than the third size to a second particle detector.

14. The air-pretreatment device of claim 8, further comprising a second discharge port disposed between the inlet port and the first filter and that is configured to discharge the particles in the air flow that are larger than the first size.

15. The air-pretreatment device of claim 8, wherein at least one of the first or second filters comprise a wafer including porous silicon configured to filter the air flow.

16. An air pre-treatment device comprising:
   means for receiving an air flow;
   first means for filtering the air flow for a first duration of time, wherein the first means comprises a first set of pores each having a first size, and wherein the first means is configured to prevent passage of first particles in the air flow that are larger than the first size;
   second means for filtering the air flow from the first means for the first duration of time, wherein the second means comprises a second set of pores each having a second size that is smaller than the first size, and wherein the second means is configured to prevent passage of second particles in the air flow that have passed through the first means and that are larger than the second size;
   means for expelling the air flow from the air pre-treatment device;
   a discharge port separate from the expelling means and located between the first and second filtering means; and
   means for passing the second particles to a first particle detector by drawing air through the discharge port after the first duration of time has lapsed.

17. The air pre-treatment device of claim 16, further comprising means for measuring a change in the electrical conductivity of at least one of the first or second means.

* * * * *

UNITED STATES PATENT AND TRADEMARK OFFICE
CERTIFICATE OF CORRECTION

PATENT NO. : 8,585,799 B2  
APPLICATION NO. : 13/058944  
DATED : November 19, 2013  
INVENTOR(S) : Fujii et al.

Page 1 of 1

It is certified that error appears in the above-identified patent and that said Letters Patent is hereby corrected as shown below:

In the Specification

In Column 6, Line 36, delete "cylometer," and insert -- cytometer, --, therefor.

In the Claims

In Column 11, Line 12, in Claim 14, delete "air-pretreatment" and insert -- air pre-treatment --, therefor.

In Column 11, Line 16, in Claim 15, delete "air-pretreatment" and insert -- air pre-treatment --, therefor.

Signed and Sealed this
Fifteenth Day of April, 2014

Michelle K. Lee
*Deputy Director of the United States Patent and Trademark Office*